US011644615B2

(12) United States Patent
Li et al.

(10) Patent No.: US 11,644,615 B2
(45) Date of Patent: May 9, 2023

(54) BACKLIGHT UNIT INCLUDING A POSITION LIMITING AND FIXING STRUCTURE AND DISPLAY ASSEMBLY INCLUDING THE SAME

(71) Applicants: Beijing BOE Display Technology Co., Ltd., Beijing (CN); BOE TECHNOLOGY GROUP CO., LTD., Beijing (CN)

(72) Inventors: Huiyan Li, Beijing (CN); Yu Zhang, Beijing (CN); Bochang Wang, Beijing (CN); Fuxue Liang, Beijing (CN); Shixin Geng, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/556,164

(22) Filed: Dec. 20, 2021

(65) Prior Publication Data
US 2022/0299702 A1    Sep. 22, 2022

(30) Foreign Application Priority Data
Mar. 16, 2021 (CN) .......................... 202110282510.2

(51) Int. Cl.
*F21V 8/00*       (2006.01)

(52) U.S. Cl.
CPC ......... *G02B 6/0091* (2013.01); *G02B 6/0055* (2013.01); *G02B 6/0088* (2013.01)

(58) Field of Classification Search
CPC .................................................... G02B 6/0091
See application file for complete search history.

(56) References Cited

U.S. PATENT DOCUMENTS

| 2012/0281151 | A1* | 11/2012 | Abe | G02B 6/0091 |
| | | | | 348/739 |
| 2015/0268412 | A1* | 9/2015 | Lee | G02B 6/0091 |
| | | | | 362/613 |
| 2016/0299286 | A1* | 10/2016 | Choi | G02B 6/0068 |

* cited by examiner

*Primary Examiner* — Keith G. Delahoussaye
(74) *Attorney, Agent, or Firm* — Houtteman Law LLC

(57) ABSTRACT

A backlight unit includes: a back plate including a bottom wall and a side wall around a periphery of the bottom wall; a lamp strip including a substrate and lamp beads on the substrate; a light guide plate on a side of the bottom wall provided with the side wall, the lamp strip being on a first side wall of the side wall, and light emitting surfaces of the lamp beads being opposite to a side surface of the light guide plate; and a position limiting and fixing structure between the light guide plate and each of the back plate and the lamp strip, for limiting and fixing a position of the lamp strip relative to the light guide plate to keep a gap between the light emitting surfaces of the lamp beads and a light incident surface of the light guide plate unchanged during turn-over of the backlight unit.

19 Claims, 14 Drawing Sheets

| items | materials | expansion coefficient | dimensions | | | expansion ($\Delta T=5°C$) | contraction ($\Delta T=5°C$) | injection tolerance of light guide plate | manufacturing tolerance of lamp strip | required distance A | design distance B | remarks |
|---|---|---|---|---|---|---|---|---|---|---|---|---|
| light guide plate | PC | 0.00007 | left-right direction | total length | 271.55 | 1.19 | 1.19 | ±0.15 | / | 1.41 | / | * |
| | | | | sub-stopper | 0 | 0.02 | 0.02 | ±0.1 | ±0.15 | 0.24 | 0.8 | meeting requirements on space |
| | | | | sub-stopper | 86.45 | 0.37 | 0.37 | ±0.1 | ±0.15 | 0.59 | 0.8 | meeting requirements on space |
| | | | | sub-stopper | 179.25 | 0.69 | 0.69 | ±0.1 | ±0.15 | 0.91 | 0.8 | meeting requirements on space |
| | | | up-down direction | total width | 174.60 | 0.77 | 0.77 | ±0.15 | ±0.15 | 0.99 | / | * |

FIG. 9

| items | thick-ness | effective compression ratio | compressible space ◆ | fit interval ♦ | total available space ⬤✱◆+♦ | required distance ▲ |
|---|---|---|---|---|---|---|
| 81 | 0.80 | 0.55 | 0.28 | 0.10 | 0.38 | 0 |
| 61 | 2.20 | 0.55 | 1.21 | -0.20 | 1.01 | 0.99 |
| 61 | 0.80 | 0.55 | 0.28 | 0.10 | 0.38 | 0 |
|  | / | / | / | / | / | / |
| 81 | 2.00 | 0.55 | 1.10 | 0.60 | 1.90 | 1.41 |
| 71 | 2.20 | 0.55 | 1.21 | -0.20 | 1.01 | 0.99 |
| 71 | 2.00 | 0.55 | 1.10 | 0.60 | 1.90 | 1.41 |
|  | / | / | / | / | / | / |

FIG. 10

BACKLIGHT UNIT INCLUDING A POSITION LIMITING AND FIXING STRUCTURE AND DISPLAY ASSEMBLY INCLUDING THE SAME

CROSS REFERENCE TO RELATED APPLICATIONS

The present disclosure claims the priority of the Chinese Patent Application No. 202110282510.2 entitled "backlight unit and display assembly" filed on Mar. 16, 2021, the content of which is incorporated herein by reference in its entirety.

TECHNICAL FIELD

The present disclosure relates to the field of display technology, and particularly to a backlight unit and a display assembly.

BACKGROUND

Along with multivariate development of application scenes, application of a same display assembly to different scenes becomes a more and more extensive mode for reducing the cost.

For a backlight unit of a display assembly, in a conventional side-in type backlight unit, a lamp strip is generally arranged at a lower side of the normally placed display assembly, namely the lower side is a light incident side, and a rubber pad is provided at an upper side for limiting a position of a light guide plate. This scheme utilizes the action of gravity, ensures a gap between lamp beads and light incident surface of the light guide plate at the lower side, thus ensuring a light incident efficiency of the light emitted from the lamp beads incident into the light guide plate.

SUMMARY

The present disclosure provides a backlight unit, including:

a back plate including a bottom wall and a side wall around a periphery of the bottom wall;

a lamp strip including a substrate and lamp beads arranged on the substrate;

a light guide plate arranged on a side of the bottom wall provided with the side wall, the lamp strip being arranged on a first side wall of the side wall, and light emitting surfaces of the lamp beads being opposite to a side surface of the light guide plate; and a position limiting and fixing structure arranged between the light guide plate and the back plate and between the light guide plate and the lamp strip, for limiting and fixing a position of the lamp strip relative to the light guide plate so that a gap between the light emitting surfaces of the lamp beads and a light incident surface of the light guide plate is kept unchanged during the backlight unit being turned over.

Optionally, the side wall further includes a second side wall, a third side wall, and a fourth side wall, the fourth side wall is opposite to the first side wall, and the second side wall is opposite to the third side wall; and the position limiting and fixing structure includes an adhesive strip, the adhesive strip is arranged between light guide plate and the bottom wall, and close to the second side wall, and two sides of the adhesive strip are adhesively connected to the light guide plate and the bottom wall respectively.

Optionally, an extension direction of the adhesive strip is parallel to an extension direction of the second side wall;

the adhesive strip includes a first adhesive layer, an elastic film layer and a second adhesive layer, which are sequentially superposed together; and the first adhesive layer is adhesively connected to the light guide plate, and the second adhesive layer is adhesively connected to the bottom wall.

Optionally, the backlight unit further includes a reflective sheet disposed between the bottom wall and the light guide plate; and the second adhesive layer extends to a position between the reflective sheet and the bottom wall, and two sides of the second adhesive layer are adhesively connected to the reflective sheet and the bottom wall, respectively.

Optionally, the reflective sheet and the elastic film layer have a same thickness.

Optionally, the reflective sheet and the elastic film layer are spaced apart by a predetermined distance.

Optionally, the position limiting and fixing structure further includes a first position limiting part and a second position limiting part, the first position limiting part is arranged between the second side wall and the light guide plate; the first position limiting part is in contact with the second side wall, and is spaced apart from the light guide plate by a first distance; and the second position limiting part is arranged between the third side wall and the light guide plate; the second position limiting part is in contact with the third side wall, and is spaced apart from the light guide plate by a second distance.

Optionally, the first position limiting part includes two first sub-parts which are located at a position where the second side wall is connected to the first side wall and a position where the second side wall is connected to the fourth side wall, respectively; and the second position limiting part includes two second sub-parts which are located at a position where the third side wall is connected to the first side wall and a position where the third side wall is connected to the fourth side wall, respectively.

Optionally, the first position limiting part includes at least three first sub-parts which are distributed at equal intervals, and two of the first sub-parts are located at a position where the second side wall is connected to the first side wall and a position where the second side wall is connected to the fourth side wall, respectively; and the second position limiting part includes at least three second sub-parts which are distributed at equal intervals, and two of the second sub-parts are located at a position where the third side wall is connected to the first side wall and a position where the third side wall is connected to the fourth side wall, respectively.

Optionally, the first distance is smaller than the second distance.

Optionally, a material of the first position limiting part and a material of the second position limiting part both include rubber.

Optionally, the position limiting and fixing structure further includes a third position limiting part located between the fourth side wall and the light guide plate; and the third position limiting part is in contact with the fourth side wall, and is in interference fit with the light guide plate.

Optionally, the third position limiting part includes two third sub-parts which are located at a position where the fourth side wall is connected to the second side wall and a position where the fourth side wall is connected to the third side wall, respectively.

Optionally, the third position limiting part includes at least three third sub-parts which are distributed at equal intervals, and two of the third sub-parts are located at a position where the fourth side wall is connected to the second side wall and a position where the fourth side wall is connected to the third side wall, respectively.

Optionally, a material of the third position limiting part includes rubber.

Optionally, the position limiting and fixing structure further includes a stopper which is located between the light guide plate and the lamp strip, and two sides of the stopper is in contact with the light guide plate and the substrate, respectively.

Optionally, the stopper includes at least three sub-stoppers along the extension direction of the lamp strip, and the at least three sub-stoppers are distributed at equal intervals; and a distance between a sub-stopper closest to the second side wall and a lamp bead adjacent to the sub-stopper closest to the second side wall is larger than a distance between a sub-stopper in a middle area of the lamp strip and a lamp bead adjacent to the sub-stopper in the middle area of the lamp strip, and is smaller than a distance between a sub-stopper closest to the third side wall and a lamp bead adjacent to the sub-stopper closest to the third side wall.

Optionally, the stopper includes at least three sub-stoppers along the extension direction of the lamp strip, and a distance between the sub-stopper closest to the third side wall and the third side wall is ⅓ of a length of the lamp strip.

Optionally, the stopper and the light guide plate have a one-piece structure.

The present disclosure further provides a display assembly, which includes a display panel and any one of the above-described backlight unit, wherein the display panel is arranged on a light emitting side of the backlight unit.

The beneficial effects of this disclosure are as follows. In the backlight unit provided by the present disclosure, the position limiting and fixing structure is arranged between the light guide plate and the back plate and between the light guide plate and the lamp strip, so that feasibility and reliability test requirements of assembling of the backlight unit can be met both in a normal use state and a 180-degree turned over use state of the backlight unit, and meanwhile, a gap between the light emitting surfaces of the lamp beads and the light incident surface of the light guide plate, when the backlight unit is turned over by 180 degrees, is ensured to be the set gap which can ensure that the light incident efficiency of light incident into the light guide plate from the lamp beads is the highest, thereby meeting design requirements on turning the backlight unit over by 180 degrees and display requirements on a display assembly that adopts this backlight unit, and promoting user experience.

Through adopting the above-described backlight unit, it can be guaranteed that a display brightness of the display assembly provided by the present disclosure will not reduce when the display assembly is turned over by 180 degrees for display, thus the display effect of this display assembly is promoted.

BRIEF DESCRIPTION OF DRAWINGS

FIG. 5b is a cross-sectional view of a structure taken along a section line AA in FIG. 5a;

FIG. 6a is a cross-sectional view of a structure taken along section lines DD and EE in FIG. 5a;

FIG. 6b is an enlarged schematic view of portion F in FIG. 6a;

FIG. 6c is an enlarged schematic view of portion G in FIG. 6a;

FIG. 6d is an enlarged schematic view of portion H in FIG. 6a;

FIG. 7a is an enlarged schematic view of portion I in FIG. 5a;

FIG. 7b is an enlarged schematic view of portion J in FIG. 5a;

FIG. 7c is an enlarged schematic view of portion K in FIG. 5a;

FIG. 9 is a table illustrating parameters such as a required distance between a sub-stopper and its adjacent beads;

FIG. 10 is a table illustrating parameters such as a usable space of each position limiting part for limiting the light guide plate's position;

DETAIL DESCRIPTION OF EMBODIMENTS

In order to enable one of ordinary skill in the art to better understand the technical scheme of the present disclosure, a backlight unit and a display assembly provided by the present disclosure will be described in further detail below with reference to the accompanying drawings and the exemplary embodiments.

Inventors of the present disclosure have found that when a conventional side-in type backlight unit is turned over by 180 degrees for use, a light guide plate of the backlight unit sinks towards an opposite side of the lamp strip at an upper side under the action of gravity, and a rubber pad at a lower side is compressed, so that a gap between the lamp beads and the light incident surface of the light guide plate is greatly increased, and a light incident efficiency of the light emitted by the lamp beads incident into the light guide plate is reduced. As a result, not only a brightness of a displayed image but also a quality of the displayed image are degraded.

In order to at least solve the above-mentioned technical problem, the present disclosure provides a backlight unit and a display assembly.

Figure 1:
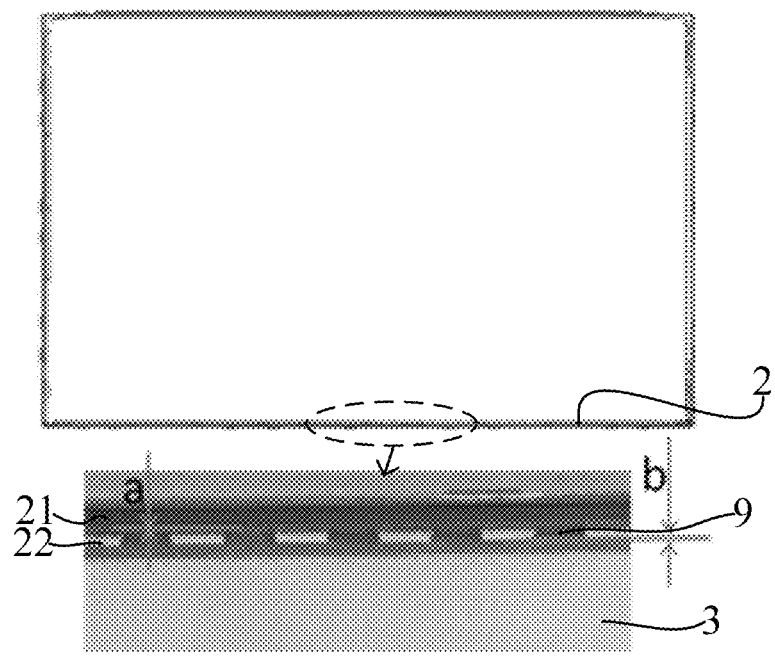
FIG. 1 is a schematic diagram illustrating a distance relationship between a light guide plate and lamp beads when a display assembly is in a normal use state.
Figure 2:
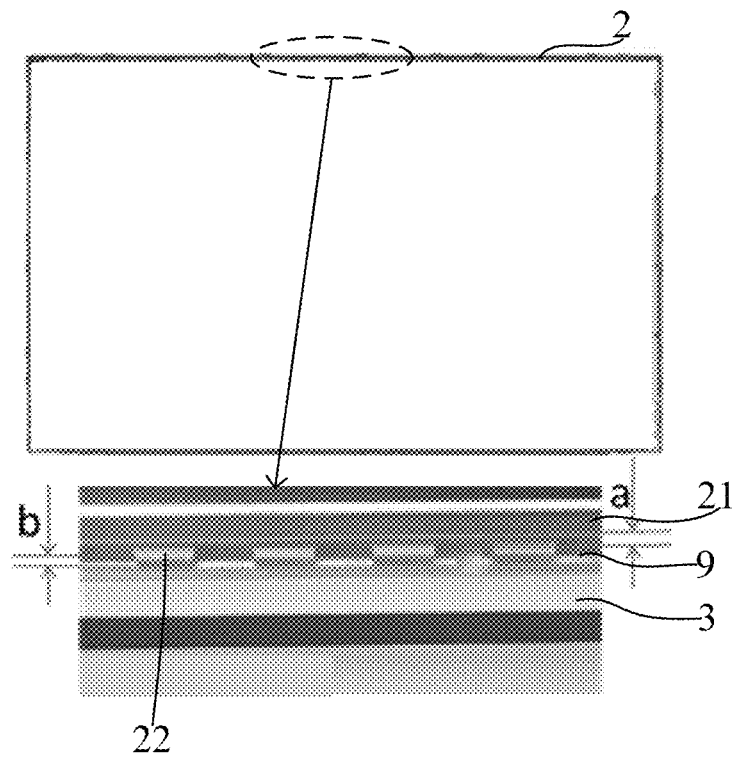
FIG. 2 is a schematic diagram illustrating a distance relationship between a light guide plate and lamp beads when the display assembly is in a use state where the display assembly is turned over by 180 degrees.
Figure 3:
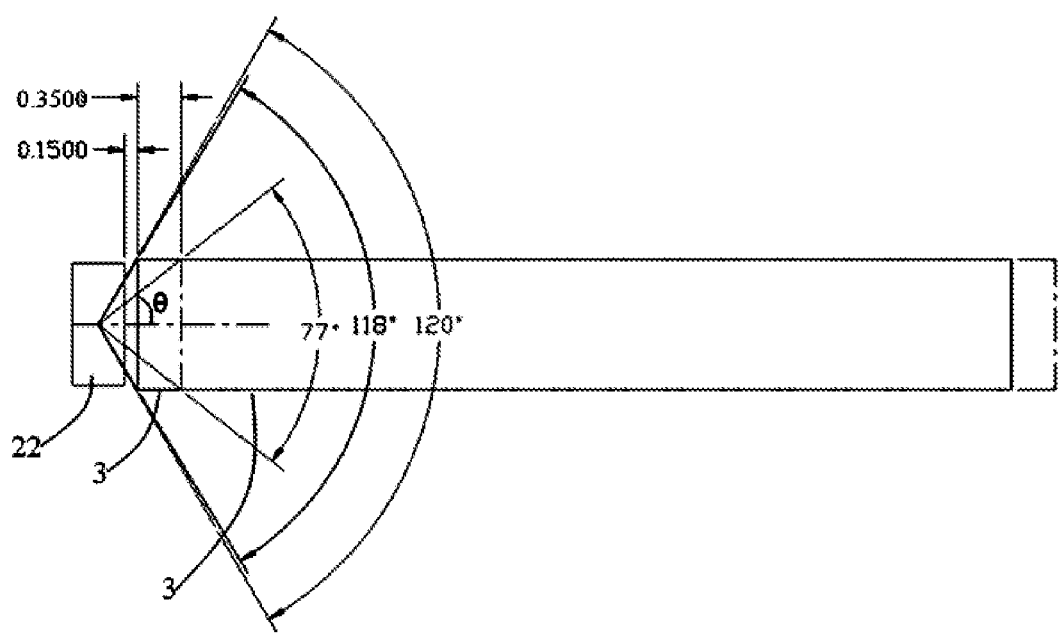
FIG. 3 is a schematic diagram illustrating a relationship between light incident efficiencies of the lamp beads and different gaps between the light guide plate and the lamp beads.

Referring to FIGS. 1 to 3, in a normal use state of the display assembly adopting the side-in type backlight unit, a lamp strip 2 is located at a lower side of the backlight unit. The lamp strip 2 includes a substrate 21 and lamp beads (for example, light emitting diodes (LEDs)) 22 disposed on the substrate 21, and the substrate 21 and a stopper 9 (in a case of where the stopper 9 includes a plurality of sub-stoppers, reference numeral 9 also indicates each sub-stopper) for limiting a position of the light guide plate 3 are fitted together with a gap of zero (i.e., a gap a as shown in FIG. 1=0) therebetween. In this case, a gap b between light emitting surfaces of the lamp beads 22 and a light incident surface of the light guide plate 3 is 0.15 mm, and an exit angle on the light emitting surface of each lamp bead 22 is 120° (i.e., −60° to +60°), wherein light with an exit angle in the range of 118° (i.e., −59° to +59°) is incident into the light guide plate 3, and becomes effective light. However, when the display assembly is turned over by 180 degrees, the lamp strip 2 is on the upper side of the backlight unit, so that the light guide plate 3 sinks downwards under the action of self-gravity, and a support on the opposite side of the lamp strip 2 is compressed. In this case, the gap a between the substrate 21 and the stopper 9 for limiting a position of the light guide plate 3 is not less than 0.35 mm (i.e., ⩾0.35 mm), and the gap b between the light emitting surfaces of the lamp beads 22 and the light incident surface of the light guide plate 3 is not less than 0.5 mm (i.e., 0.5 mm). Further, the exit angle on the light emitting surface of each lamp bead 22 is still maintained at 120° (i.e., −60° to)+60°, wherein light with an exit angle in the range of 77° (i.e., −38.5° to +38.5°) is incident into the light guide plate, and becomes effective light.

Figure 4:
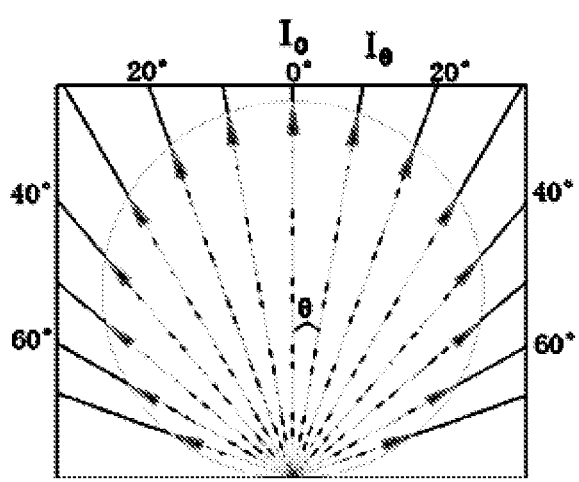
FIG. 4 is a schematic diagram of the light emission of a Lambertian light source.

Referring to FIG. 4, each lamp bead may be approximated to a Lambertian light source, and according to a calculation formula of light intensity of the Lambertian light source: $I=I_0*\cos\theta$, the following formulas may be obtained.

Total light intensity of each lamp bead is:

$$I_{120} = \int_{-60°}^{60°} I_0 * \cos\theta * d\theta = 2 * I_0 * \sin 60°;$$

Effective light intensity of the light guide plate when the display assembly is in the normal use state is:

$$I_{118} = \int_{-59°}^{59°} I_0 * \cos\theta * d\theta = 2 * I_0 * \sin 59°;$$

Effective light intensity of the light guide plate when the display assembly is turned over by 180 degrees for use is:

$$I_{77} = \int_{-38.5°}^{38.5°} I_0 * \cos\theta * d\theta = 2 * I_0 * \sin 38.5°;$$

The light incident efficiency of the light guide plate when the display assembly is in the normal use state is:

$$\frac{I_{118}}{I_{120}} = \frac{2*I_0*\sin 59°}{2*I_0*\sin 60°} = \frac{\sin 59°}{\sin 60°} = 99\%;$$

The light incident efficiency of the light guide plate when the display assembly is turned over by 180 degrees for use is:

$$\frac{I_{77}}{I_{120}} = \frac{2*I_0*\sin 38.5°}{2*I_0*\sin 60°} = \frac{\sin 38.5°}{\sin 60°} = 71.9\%;$$

and

A loss proportion of the light efficiency of the light guide plate when the display assembly is turned over by 180 degrees for use relative to the light efficiency of the light guide plate when the display assembly is normally used is:

$$\frac{I_{118}-I_{77}}{I_{118}} = \frac{2*I_0*\sin 59° - 2*I_0*\sin 38.5°}{2*I_0*\sin 59°} = \frac{\sin 59° - \sin 38.5°}{\sin 59°} = 27.4\%.$$

It can be known from the above-mentioned calculation that if the display assembly is turned over by 180 degrees for use, the light incident efficiency of each lamp bead will be reduced by 27.4% (i.e., (99%−71.9%)/99%=27.4%), which greatly reduces the light incident efficiency of the light emitted by each lamp bead incident into the light guide plate, thereby greatly affecting the effect of user experience.

To solve the problem that the incident light efficiency of the light emitted from each lamp bead incident into the light guide plate is reduced when the display assembly is turned over by 180 degrees for use, referring to FIGS. 5a to 10, an embodiment of the present disclosure provides a backlight unit including a back plate 1, a lamp strip 2 and a light guide plate 3. The back plate 1 includes a bottom wall 11 and a side wall around a periphery of the bottom wall 11. The lamp strip 2 includes a substrate 21 and lamp beads 22 disposed on the substrate 21 (for example, see FIG. 6d). The light guide plate 3 is arranged above the bottom wall 11. The lamp strip 2 is arranged on a first side wall 12 of the side wall of the back plate 1, and the light emitting surface of each of the lamp beads 22 is opposite to a side surface of the light guide plate 3. The backlight unit further includes a position limiting and fixing structure, which is arranged between the light guide plate 3 and the back plate 1 and between the light guide plate 3 and the lamp strip 2, and is used for limiting and fixing a position of the light guide plate 3 relative to the lamp strip 2 so as to ensure that a set gap (e.g., a preset gap) is maintained between the light emitting surfaces of the lamp beads 22 and the light incident surface of the light guide plate 3 when the backlight unit is turned over by 180 degrees. The set gap enables the light incident from the lamp beads 22 into the light guide plate 3 to have the highest light incident efficiency.

Since the position limiting and fixing structure is arranged between the light guide plate 3 and each of the lamp strip 2 and the back plate 1, feasibility and reliability test requirements of assembling of the backlight unit can be met both in the normal use state and a 180-degree turned over use state (i.e., in a use state in which the backlight unit is turned over by 180 degrees), and meanwhile, it is ensured that the light emitting surfaces of the lamp beads 22 and the light incident surface of the light guide plate 3, when the backlight unit is turned over by 180 degrees, have therebetween the set gap which can enable the light incident efficiency of light incident into the light guide plate 3 from the lamp beads 22 to be the highest, thereby meeting the design requirements on turning the backlight unit over by 180 degrees and the display requirements on a display assembly that adopts this backlight unit, and promoting user experience.

Optionally, in this embodiment, referring to FIGS. 5a to 5d, the side wall of the back plate 1 further includes a second side wall 13, a third side wall 14, and a fourth side wall 15. The fourth side wall 15 is opposite to the first side wall 12, and the second side wall 13 is opposite to the third side wall 14. The position limiting and fixing structure includes an adhesive strip 4, and the adhesive strip 4 is arranged between the light guide plate 3 and the bottom wall 11. Further, the adhesive strip 4 is distributed close to the second side wall 13, and two sides of the adhesive strip 4 are adhesively connected to the light guide plate 3 and the bottom wall 11, respectively. The adhesive strip 4 may firmly fix one end, which corresponds to the second side wall 13, of the light guide plate 3 to the back plate 1, and prevent the light guide plate 3 from moving relative to the back plate 1 during the backlight unit being turned over.

Optionally, a composite tape is adopted as the adhesive tape 4.

Optionally, an extension direction of the adhesive strip 4 is parallel to an extension direction of the second side wall 13. The adhesive tape 4 includes a first adhesive layer 41, an elastic film layer 42, and a second adhesive layer 43, which are sequentially superposed (or stacked) together. The first adhesive layer 41 is adhesively connected to the light guide plate 3, and the second adhesive layer 43 is adhesively connected to the bottom wall 11. The first adhesive layer 41 and the second adhesive layer 43 are both double-sided adhesive tapes.

Optionally, a width m of each of the first adhesive layer 41 and the elastic film layer 42 in a direction perpendicular to the extension direction of the adhesive strip 4 ranges from 1.952 mm to 2.928 mm, and a width n of the second adhesive layer 43 in the direction perpendicular to the extension direction of the adhesive tape 4 ranges from 4.512 mm to 6.768 mm. Optionally, the width m of each of the first adhesive layer 41 and the elastic film layer 42 in the direction perpendicular to the extension direction of the adhesive strip 4 is 2.44 mm, and the width n of the second adhesive layer 43 in the direction perpendicular to the extension direction of the adhesive strip 4 is 5.64 mm. A thickness of the first adhesive layer 41 (i.e., a dimension of the first adhesive layer 41 in a stacking direction of the first adhesive layer 41, the elastic film layer 42, and the second adhesive layer 43) is 0.05 mm, and a thickness of the second adhesive layer 43 (i.e., a dimension of the second adhesive layer 43 in the stacking direction of the first adhesive layer 41, the elastic film layer 42, and the second adhesive layer 43) is 0.05 mm.

Optionally, in this embodiment, the backlight unit further includes a reflective sheet (e.g., a reflector) 5, and the reflective sheet 5 is disposed between the bottom wall 11 and the light guide plate 3. The second adhesive layer 43 extends to a position between the reflective sheet 5 and the bottom wall 11, and two sides of the second adhesive layer 43 are adhesively connected to the reflective sheet 5 and the bottom wall 11, respectively. The second adhesive layer 43 is a double-sided adhesive tape, and may fix and connect the reflective sheet 5 to the back plate 1, so that a position of the reflective sheet 5 relative to the back plate 1 is fixed, and the reflective sheet 5 is prevented from moving relative to the back plate 1 during the backlight unit being turned over.

Optionally, a thickness of the reflective sheet 5 is equivalent (e.g., equal) to that of the elastic film layer 42, and the reflective sheet 5 and the elastic film 42 are spaced apart from each other by a predetermined distance s. The predetermined distance s is in the range of 0.16 mm to 0.24 mm. Optionally, the predetermined distance s is 0.2 mm, i.e., a reserved assembly gap between the elastic film layer 42 and the reflective sheet 5 is 0.2 mm. Optionally, a portion, which has a width of 3 mm in the direction perpendicular to the extension direction of the adhesive strip 4, of the second adhesive layer 43 with the width n in the direction perpendicular to the extension direction of the adhesive strip 4, is used for fixing the reflective sheet 5 to the back plate 1.

In this embodiment, the elastic film 42 is made of a foam (i.e., a foamed material). The elastic film 42 carries the first adhesive layer 41 for fixing the light guide plate 3 upwards, and is connected to the second adhesive layer 43 for fixing the back plate 1 downwards, which has the functions of on one hand compensating a height difference caused by the arrangement of the reflective sheet 5 and on the other hand providing a displacement space for the light guide plate 3 when the light guide plate 3 expands or contracts along with the temperature change. In a case where the light guide plate 3 is adhered to the back plate 1 directly by a conventional double-sided adhesive tape, since a thermal expansion coefficient of the light guide plate 3 (such as a light guide plate made of a PC material) is much larger than that of the back plate 1 (such as a back plate made of an SGLC (Steel-Galvanized-Aluminum-Commercial, i.e., Aluminum Zinc Alloy Coated Steel) material), the light guide plate 3 and the back plate 1 may not synchronously expand or contract, so that the back plate 1 easily pulls the light guide plate 3, and the light guide plate 3 has a risk of warping. However, in the present embodiment, the elastic film 42 made of a foamed material has good tensile and compression properties, and serves as a transition material for fixing the light guide plate 3 to the back plate 1. Thus, the elastic film 42 can effectively prevent the light guide plate 3 from warping in the reliability test.

Optionally, in this embodiment, the position limiting and fixing structure further includes a first position limiting part 6 and a second position limiting part 7, and the first position limiting part 6 is disposed between the second side wall 13 and the light guide plate 3. The first position limiting part 6 is in contact with the second side wall 13, and the first position limiting part 6 and the light guide plate 3 are spaced apart from each other by a first distance x (as shown in FIG. 5c). The second position limiting part 7 is disposed between the third side wall 14 and the light guide plate 3. The second position limiting part 7 is in contact with the third side wall 14, and the second position limiting part 7 and the light guide plate 3 are spaced apart from each other by a second distance y (as shown in FIG. 5d). A material of the first position limiting part 6 and a material of the second position limiting part 7 both include rubber. The arrangement of the first position limiting part 6 and the second position limiting part 7 can effectively protect the light guide plate 3 in a backlight unit packaging material vibration test and a monomer vibration test, to prevent the light guide plate 3 from being damaged by collision with the back plate 1, so that the display assembly adopting this backlight unit is prevented from displaying white spots.

Figure 5A:
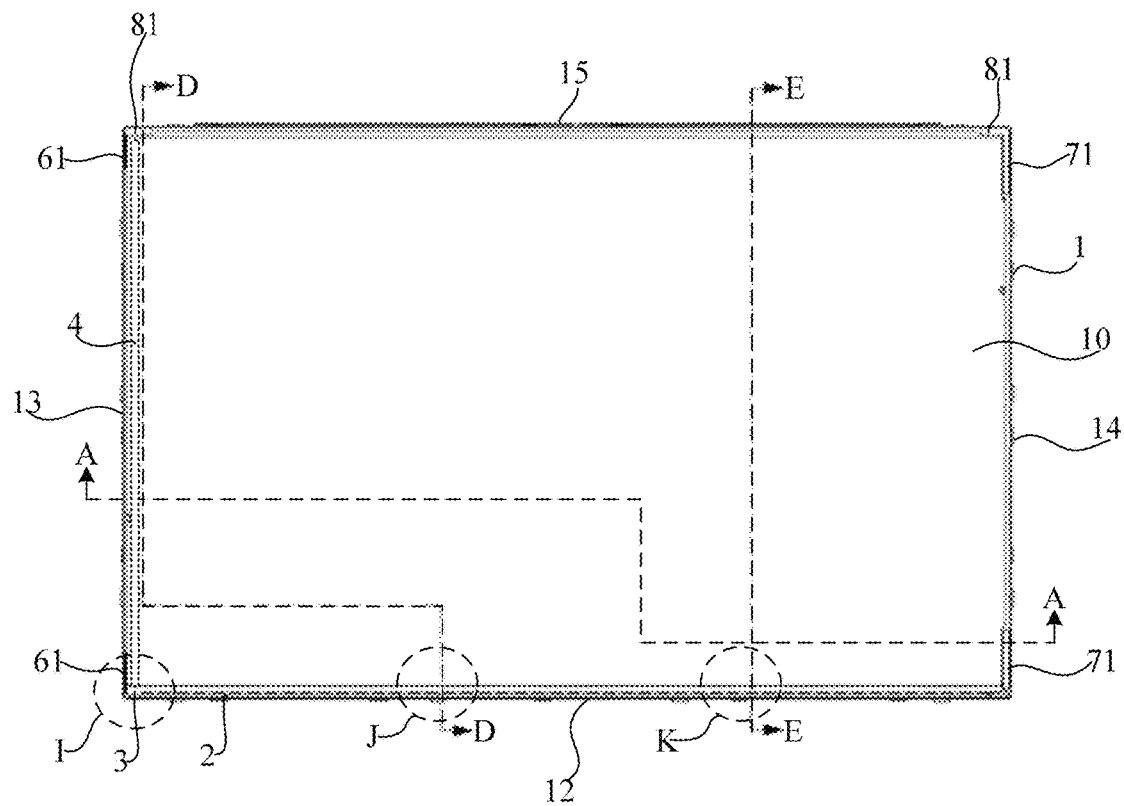
FIG. 5a is a schematic top view of a structure of a backlight unit according to an embodiment of the present disclosure.
Figure 5B:
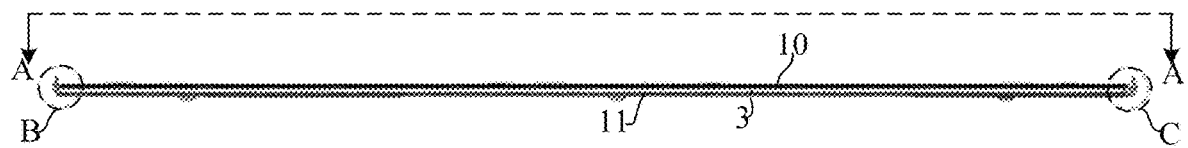
Figure 5C:
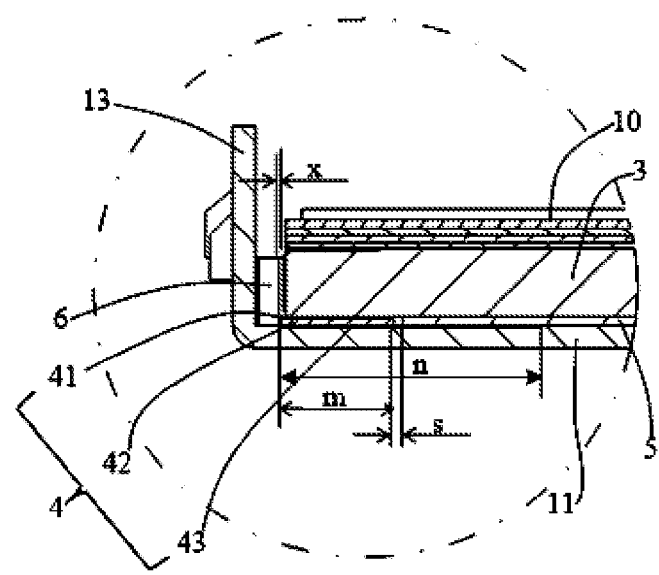
FIG. 5c is an enlarged schematic view of portion B in FIG. 5b.
Figure 5D:
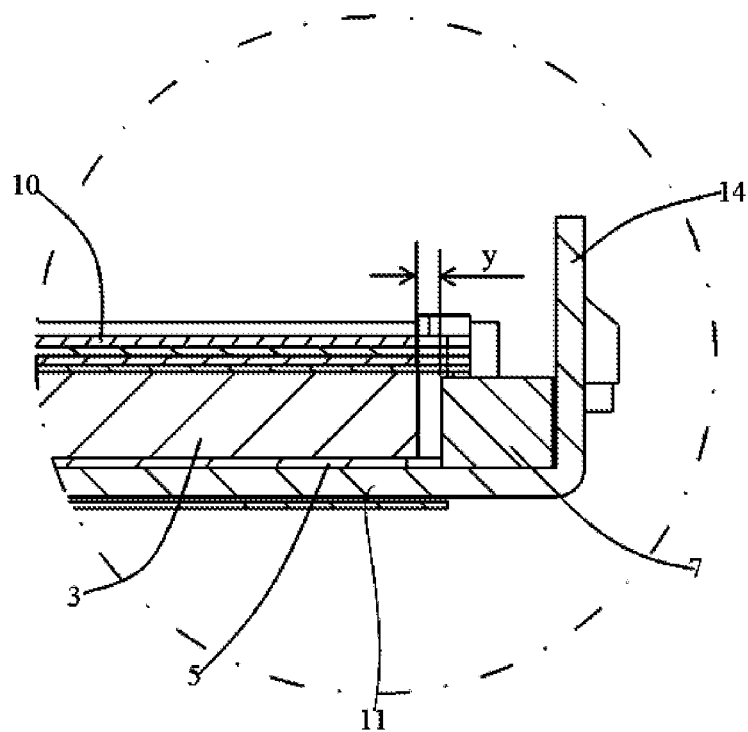
FIG. 5d is an enlarged schematic view of portion C in FIG. 5b.
Figure 6A:
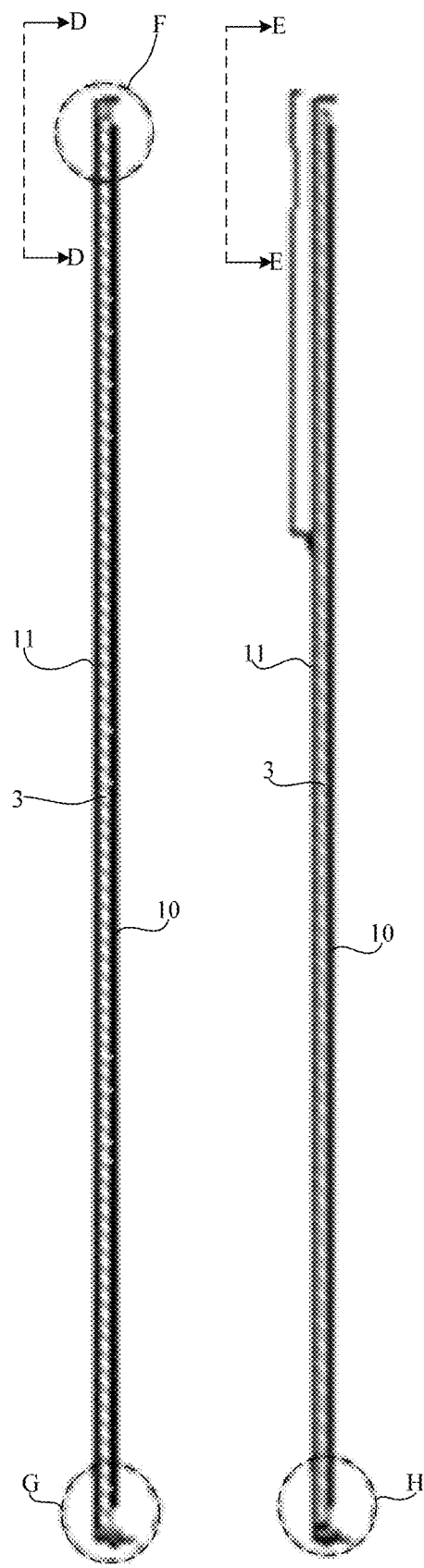
Figure 6B:
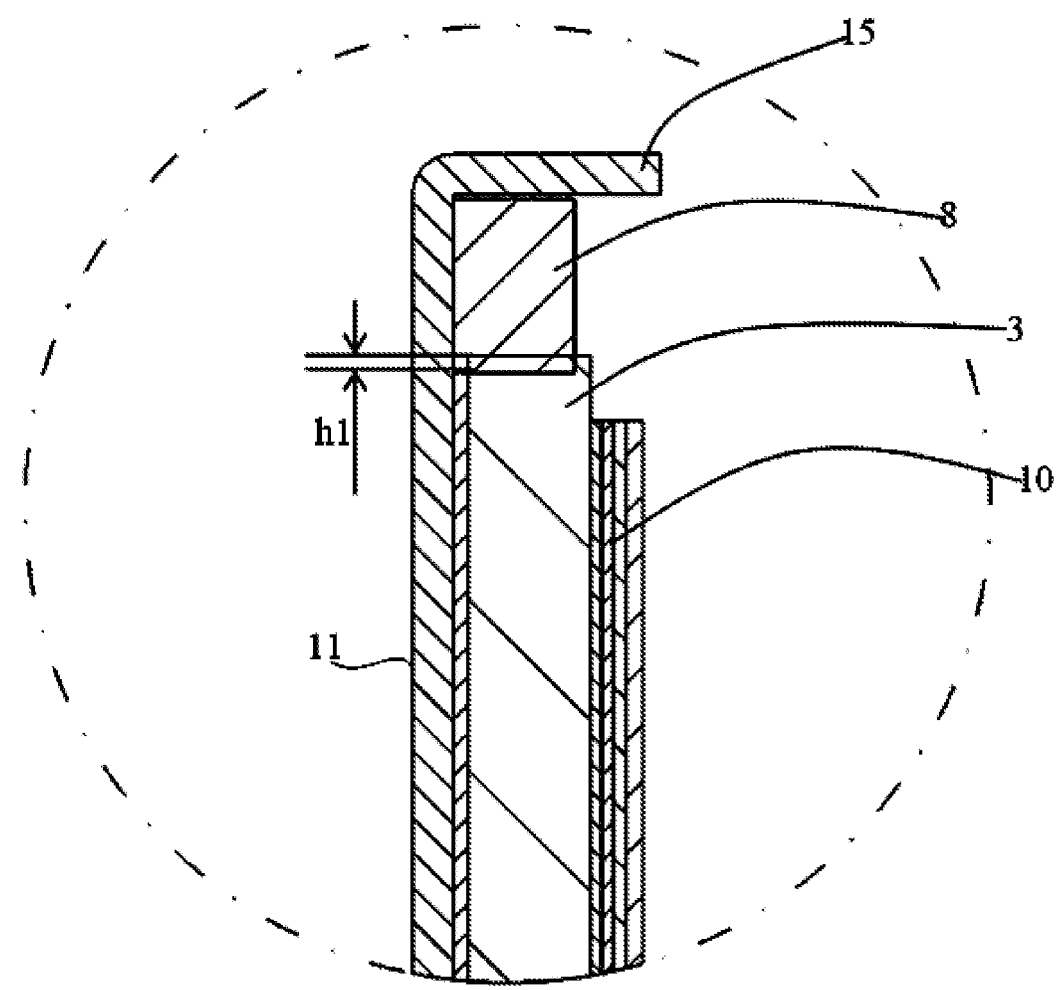
Figure 6C:
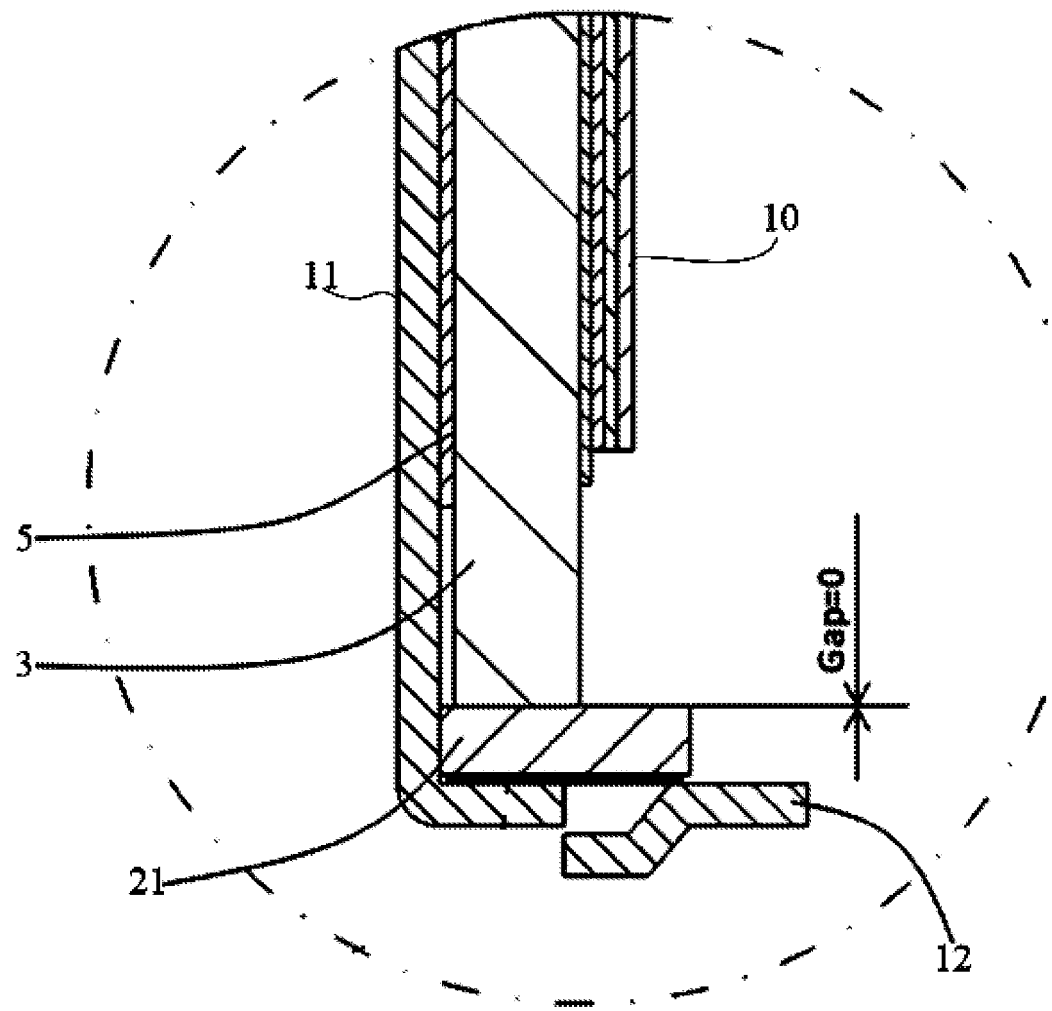
Figure 6D:
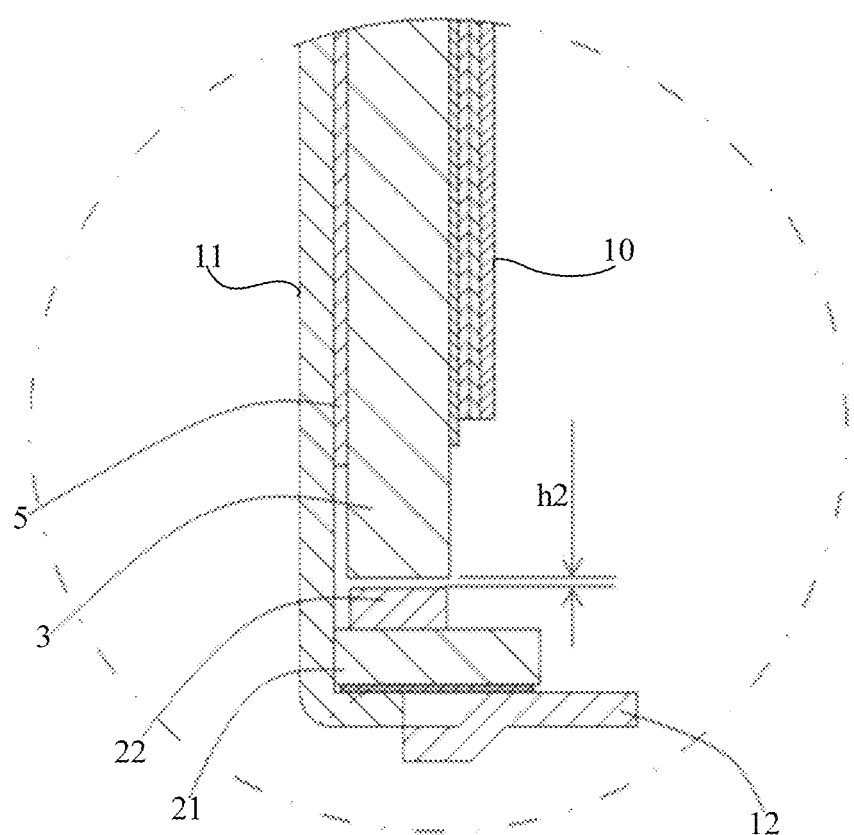

Optionally, the first position limiting part 6 includes at least three first sub-parts 61 which are distributed at equal intervals (i.e., are spaced apart from each other by a constant interval), and two of the at least three first sub-parts 61 are respectively located at a position where the second side wall 13 is connected to the first side wall 12 and a position where the second side wall 13 is connected to the fourth side wall 15 (as shown in FIG. 5*a*). The second position limiting part 7 includes at least three second sub-parts 71 which are distributed at equal intervals, and two of the at least three second sub-parts 71 are respectively located at a position where the third side wall 14 is connected to the first side wall 12 and a position where the third side wall 14 is connected to the fourth side wall 15 (as shown in FIG. 5*a*). A plurality of first sub-parts 61 are disposed to prevent the light guide plate 3 from colliding with the second side wall 13 during a vibration test, so as to prevent a side of the light guide plate 3 corresponding to the second side wall 13 from being damaged by collision. A plurality of second sub-parts 71 are disposed to prevent the light guide plate 3 from colliding with the third side wall 14 in a vibration test, thereby preventing a side of the light guide plate 3 corresponding to the third side wall 14 from being damaged by collision.

It should be noted that the first position limiting part 6 may alternatively be of a strip shape, and a strip-shaped first position limiting part 6 is distributed throughout the entire second side wall 13. The second position limiting part 7 may alternatively be of a strip shape, and a strip-shaped second position limiting part 7 is distributed throughout the entire third side wall 14.

Optionally, the first distance x is smaller than the second distance y. Optionally, the first distance x is in the range of 0.08 mm to 0.12 mm, and the second distance y is in the range of 0.32 mm to 0.48 mm. Optionally, the first distance x is 0.1 mm, and the second distance y is 0.4 mm. Optionally, a thickness of the first position limiting part 6 in a direction away from the second side wall 13 is 0.5 mm, and a thickness of the second position limiting part 7 in a direction away from the third side wall 14 is 2 mm. The above-mentioned dimension (or size) settings of the first distance x and the second distance y can ensure that the light guide plate 3 has sufficient space to accomplish a high temperature expansion stroke in a backlight unit reliability test, thereby preventing the light guide plate 3 from swelling because of the high temperature expansion.

Optionally, in this embodiment, referring to FIGS. 6*a* to 6*d*, the position limiting and fixing structure further includes a third position limiting part 8 located between the fourth side wall 15 and the light guide plate 3. The third position limiting part 8 is in contact with the fourth side wall 15, and is in interference fit with the light guide plate 3. A material of the third position limiting part 8 includes rubber. In the interference fit, an interference value between the third position limiting part 8 and the light guide plate 3 is used for generating an elastic pressure between the third position limiting part 8 and the surface of the light guide plate 3 after assembly, so that a tight connection is obtained. The interference means that the overall dimension of the third position limiting part 8 and the light guide plate 3 after being fitted (or after assembly) is smaller than a sum of the respective dimensions of the third position limiting part 8 and the light guide plate 3 before being fitted. By arranging the third position limiting part 8 between the fourth side wall 15 and the light guide plate 3, the light guide plate 3 can be prevented from colliding with the fourth side wall 15 in a vibration test and during the backlight unit is turned over, so that a side of the light guide plate 3 corresponding to the fourth side wall 15 is prevented from being damaged by collision. By means of interference fit between the third position limiting part 8 and the light guide plate 3, in the vibration test and during the backlight unit is turned over, the light guide plate 3 can be prevented from shaking between the first side wall 12 and the fourth side wall 15, so that the gap between the light emitting surfaces of the lamp beads 22 and the light incident surface of the light guide plate 3 is ensured to be unchanged, and the gap is kept to be the set gap which enables the light incident efficiency of the light incident to the light guide plate 3 from each lamp bead 22 to be the highest.

Optionally, an interference dimension (i.e., the interference value) h1 of the interference fit between the third position limiting part 8 and the light guide plate 3 is in the range of 0.16 mm to 0.24 mm. Optionally, the interference dimension h1 of the interference fit between the third position limiting part 8 and the light guide plate 3 is 0.2 mm.

Optionally, the third position limiting part 8 includes at least three third sub-parts 81 which are distributed at equal intervals, and two of the at least three third sub-parts 81 are respectively located at a position where the fourth side wall 15 is connected to the second side wall 13 and a position where the fourth side wall 15 is connected to the third side wall 14 (as shown in FIG. 5*a*). A plurality of third sub-parts 81 are disposed to prevent the light guide plate 3 from colliding with the fourth side wall 15 in a vibration test, thereby preventing a side of the light guide plate 3 corresponding to the fourth side wall 15 from being damaged by collision.

It should be noted that the third position limiting part 8 may alternatively be of a strip shape, and a strip-shaped third position limiting part 8 is distributed throughout the entire fourth side wall 15.

Figure 7A:
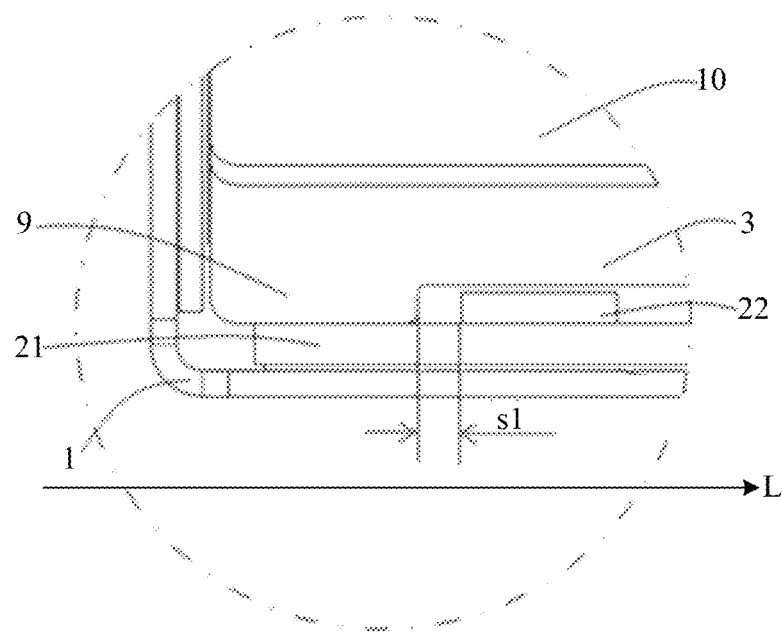
Figure 7B:
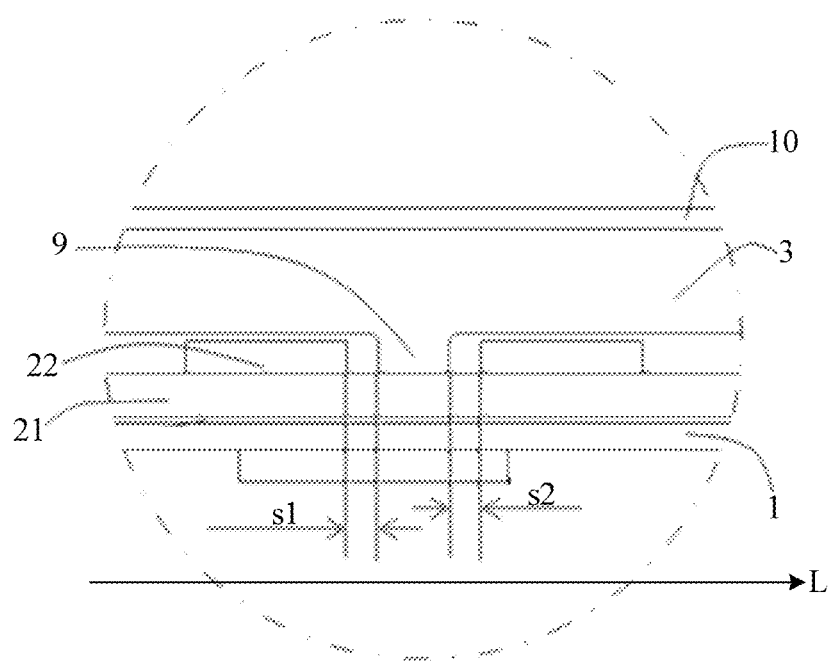
Figure 7C:
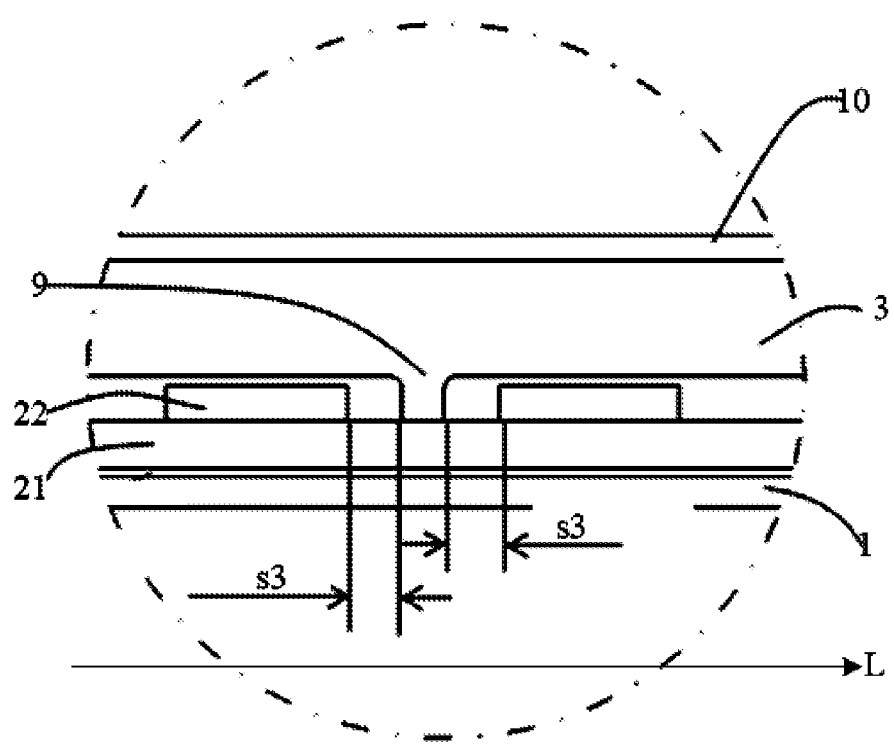

Optionally, in this embodiment, referring to FIGS. 7*a* to 7*c*, the position limiting and fixing structure further includes a stopper 9. The stopper 9 is located between the light guide plate 3 and the lamp strip 2, and two sides of the stopper 9 is in contact with the light guide plate 3 and the substrate 21, respectively. A material of the stopper 9 is the same as that of the light guide plate 3, and the stopper 9 and the light guide plate 3 are integrally formed (i.e., have a one-piece structure, as shown in FIG. 7*a*). Alternatively, the stopper 9 may be provided separately. The stopper 9 is arranged to prevent the light guide plate 3 from shaking between the first side wall 12 and the fourth side wall 15 in a vibration test and during the backlight unit being turned over, so as to ensure that the gap between the light emitting surface of each lamp bead 22 and the light incident surface of the light guide plate 3 is the set gap enabling the light incident efficiency of the light incident into the light guide plate 3 from the lamp bead 22 to be the highest.

Optionally, the stopper includes at least three sub-stoppers 9 along an extension direction L of the lamp strip 2 which are distributed at equal intervals. A distance s1 between a sub-stopper 9 closest to the second side wall 13 and an adjacent lamp bead 22 (i.e., a lamp bead 22 adjacent to the sub-stopper 9 closest to the second side wall 13) is larger than a distance s2 between a sub-stopper 9 in a middle area of the lamp strip 2 and an adjacent lamp bead 22 (i.e., a lamp bead 22 adjacent to the sub-stopper 9 in the middle area of the lamp strip 2), and is smaller than a distance s3 between the sub-stopper 9 closest to the third side wall 14 and an adjacent lamp bead 22 (i.e., a lamp bead 22 adjacent to the sub-stopper 9 closest to the third side wall 14). That is, along the extension direction L of the lamp strip 2, the reserved distances between different sub-stoppers 9 and their adjacent lamp beads 22 are differentiated distances. Since the expansion and contraction strokes of the light guide plate 3 corresponding to the positions of different sub-stoppers 9 are different, the reserved distances between the different sub-stoppers 9 and their adjacent lamp beads 22 are different. The closer the position of the sub-stopper 9 to the third side wall 14 is, the larger the expansion and contraction stroke thereof is, so that the larger the expansion and contraction space is required, and the larger the reserved distance between the sub-stopper 9 and the adjacent lamp bead 22 is required to be. Further, since a distance between any adjacent two of the lamp beads 22 of the lamp strip 2 is constant, in order to ensure that the reserved distance between the sub-stopper 9 closer to the third side wall 14 and a corresponding adjacent lamp bead 22 is larger, the sub-stopper 9 closer to the third side wall 14 has a smaller width along the extension direction L of the lamp strip 2. For example, the width of the sub-stopper 9 along the extension direction L of the lamp strip 2=(a distance between two adjacent lamp beads 22 corresponding to the sub-stopper 9)−(the reserved distance between the sub-stopper 9 and the corresponding adjacent lamp bead 22).

Optionally, the stopper includes at least three sub-stoppers 9 along the extension direction L of the lamp strip 2, and a distance between the sub-stopper 9 closest to the third side wall 14 and the third side wall 14 is ⅓ of a length of the lamp strip 2. A side surface, which is close to the second side wall 13, of the sub-stopper 9 closest to the second side wall 13 is flush with a side surface of the light guide plate 3 close to the second side wall 13. By the arrangement, support of the sub-stoppers 9 to the light guide plate 3 is ensured, and strength of the sub-stoppers 9 is also ensured.

Optionally, in this embodiment, along the extension direction L of the lamp strip 2, the stopper includes at least three sub-stoppers 9. The distance s1 between the sub-stopper 9 closest to the second side wall 13 and the corresponding adjacent lamp bead 22 is 0.8 mm. The distance s2 between the sub-stopper 9 at a middle position and the corresponding adjacent lamp bead 22 is 0.6 mm, and the distance s3 between the sub-stopper 9 closest to the third side wall 14 and the corresponding adjacent lamp bead 22 is 0.9 mm. Such a design is consistent with the principle that the adhesive strip 4 is designed to fix one end of the light guide plate 3 close to the second side wall 13 to the back plate 1, and is consistent with the principle that the reserved expansion gap between the second position limiting part 7 and the light guide plate 3 is designed to be larger than the reserved expansion gap between the first position limiting part 6 and the light guide plate 3. Since there is no lamp bead on the side, which is closest to the second side wall 13, of the sub-stopper 9 closest to the second side wall 13, the design space for this sub-stopper 9 is sufficient, and a side where the second side wall 13 is located and a side where the first side wall 12 is located are used as alignment references when the light guide plate 3 is assembled. Thus, the reserved distance s1 between the sub-stopper 9 closest to the second side wall 13 and the corresponding adjacent lamp bead 22 is 0.8 mm, and the distance s2 between the sub-stopper 9 at the middle position and the corresponding adjacent lamp bead 22 is 0.6 mm; and the distance s3 between the sub-stopper 9 closest to the third side wall 14 and the corresponding adjacent lamp bead 22 is 0.9 mm. The above-mentioned dimensions are all larger than the required distances A between the sub-stoppers 9 and their corresponding adjacent lamp beads 22. Each required distance A is obtained by adding an expansion and contraction displacement of each sub-stopper 9 in the reliability test to a statistical tolerance of the manufacturing tolerances of the light guide plate 3, the lamp strip 2 and the back plate 1. The expansion and contraction displacement of each sub-stopper 9 in the reliability test is calculated by considering a thermal expansion coefficient corresponding to a material of the light guide plate 3 and a maximum temperature difference corresponding to the reliability test of the backlight unit, under the condition that the side of the light guide plate 3 closest to the second side wall 13 is taken as a starting point and the position of the sub-stopper 9 is taken as an end point.

In the backlight unit in this embodiment, through fixing one end of light guide plate 3 close to the second side wall 13 by the adhesive strip 4, the light guide plate 3 expands toward and contracts away from the fourth side wall 15 with the first side wall 12 as the starting point, along with temperature variation in reliability test of the backlight unit, and under the condition that a position of each lamp bead 22 is compatible to manufacturing tolerances of the light guide plate 3 and each lamp bead 22, a set distance h2 (such as a distance of 0.15 mm) may be ensured between the light incident surface of the light guide plate 3 and the light emitting surface of each lamp bead 22. As such, the light incident efficiency of light emitted from that each lamp bead 22 incident to light guide plate 3 is effectively ensured, and it can be effectively ensured that a backlight brightness will not reduce when the backlight unit is turned over by 180 degrees, thereby promoting user experience.

Figure 8:
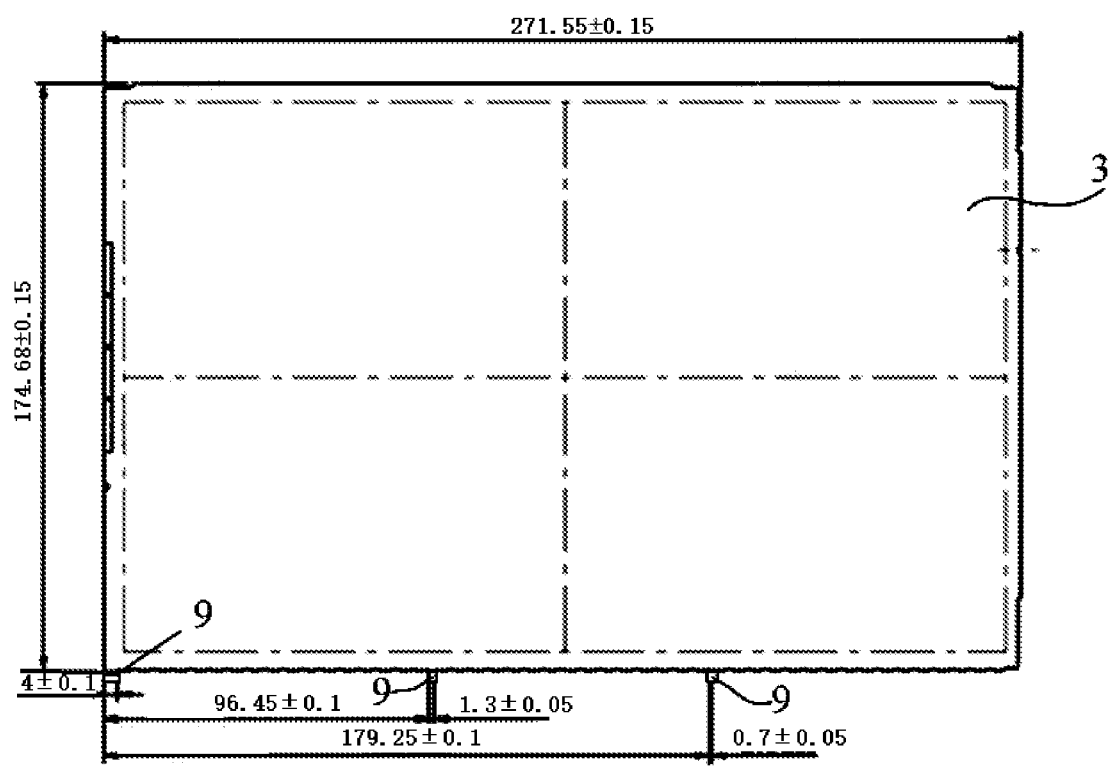
FIG. 8 is a schematic view illustrating an outline dimension of a light guide plate and a dimension indicating a position of each sub-stopper in a backlight unit.

Referring to FIG. 8, which is a schematic diagram illustrating an outline dimension of the light guide plate 3 and a dimension indicating a position of each sub-stopper 9 in a backlight unit in a practical application, here, a direction from the fourth side wall 15 to the first side wall 12 is set as an up-down direction, and a direction from the second side wall 13 to the third side wall 14 is set as a left-right direction (see FIG. 5a). Referring to FIG. 9, a required distance A (which refers to the minimum theoretical distance) between each sub-stopper 9 and the corresponding adjacent bead 22 needs to include the sum of the maximum expansion and contraction displacement amount of the sub-stopper 9 caused by temperature difference, and the statistical tolerance of the manufacturing tolerances of the sub-stopper 9 and the adjacent bead 2. As may be seen from FIG. 9, for the sub-stopper 9 closest to the second side wall 13 and the sub-stopper 9 at the middle position, the design distance B (which refers to the actual designed distance) between each sub-stopper 9 and the corresponding adjacent bead 22 is greater than or equal to the required distance A. For the sub-stopper 9 closest to the third side wall 14, the design distance B between the sub-stopper 9 and the corresponding adjacent bead 22 is approximately equal to the required distance A. Meanwhile, the design distances B of the sub-stoppers 9 need to meet design requirements.

In FIGS. 8 and 9, the units of the numerical values are all mm. For example, as may be seen from FIGS. 8 and 9, the total length of the light guide plate 3 in the left-right direction is 271.55 mm (with an injection tolerance of ±0.15 mm), and the total width of the light guide plate in the up-down direction is 174.68 mm (with an injection tolerance of ±0.15 mm). In FIG. 8, the left side of the light guide plate is taken as a starting point, a position of the left sub-stopper 9 is taken as a starting point (i.e., 0 mm), a position of the middle sub-stopper 9 is 96.45±0.1 mm from the starting point, and a position of the right sub-stopper 9 is 179.25±0.1 mm from the starting point. Further, a width of the left sub-stopper 9 in the left-right direction is 4±0.1 mm, a width of the middle sub-stopper 9 in the left-right direction is 1.3±0.05 mm, and a width of the right sub-stopper 9 in the left-right direction is 0.7±0.05 mm.

Referring to FIG. 10, for the first position limiting part 6, the second position limiting part 7 and the third position limiting part 8, a compressible space a of each position limiting part=(a thickness of the each position limiting part along the direction away from the side wall where the each position limiting part is located)*(an effective compression ratio of the each position limiting part). A fit interval b between each of the position limiting parts and the light guide plate 3 indicates an actual design interval, and in a case where a position limiting part and the light guide plate 3 are designed to be in interference fit, the fit interval b is a negative. The total available space c when the light guide plate 3 expands is c=a+b, and as may be seen from FIG. 10, the total available space c when the light guide plate 3 expands is not less than the required distance A (i.e., the minimum theoretical distance) between a position limiting part and the light guide plate 3. It should be stated that the units of the numerical values in FIG. 10 are all mm.

Figure 11:
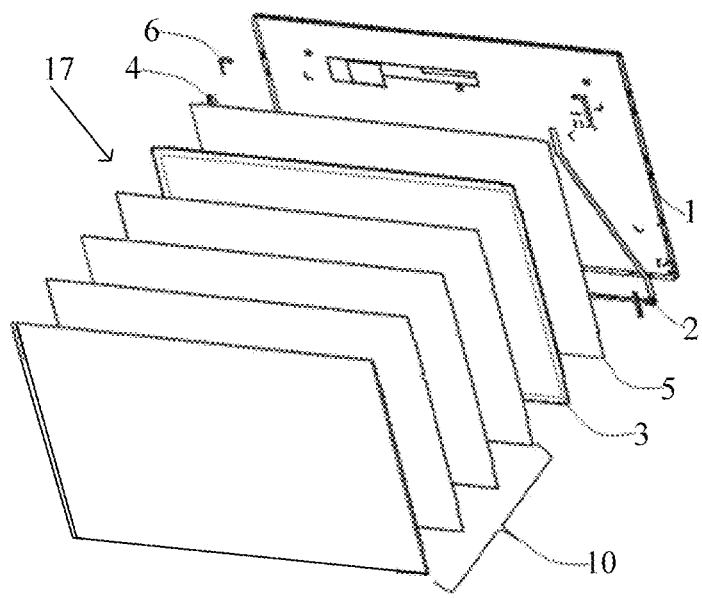
FIG. 11 is a schematic exploded view of a structure of a backlight unit according to an embodiment of the present disclosure.

Optionally, in this embodiment, referring to FIG. 11, the backlight unit further includes a plurality of optical films 10, and the plurality of optical films 10 are stacked together in sequence and located on a side of the light guide plate 3 distal to the bottom wall 11. The edges of the optical films 10 are adhesively connected to the light guide plate 3, respectively, and orthogonal projections of the adhesive connection areas of different optical films 10 with the light guide plate 3 on the bottom wall 11 do not overlap each other. Such an arrangement can ensure that the plurality of optical films 10 can be respectively fixed and connected to the light guide plate 3, therefore it can be ensured that the plurality of optical films 10 cannot shake randomly during the backlight unit being turned over. As a result, it can be ensured that each optical film 10 processes light in a stable and good manner, which is favorable to promoting backlight performance of the backlight unit.

Figure 12A:
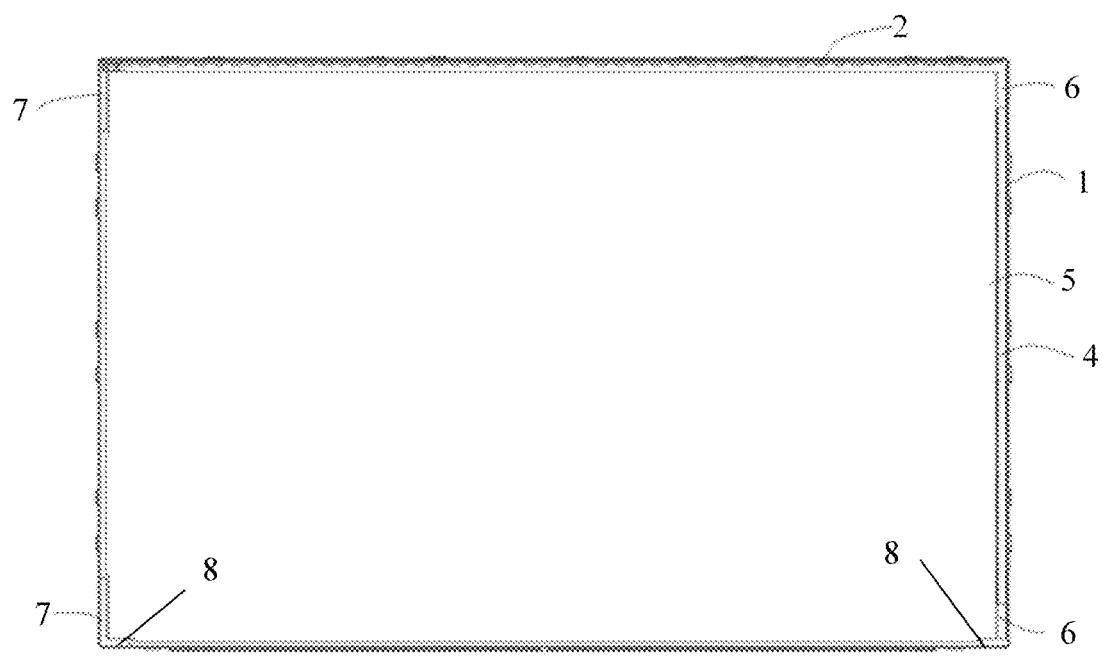
FIGS. 12a and 12b are schematic diagrams illustrating structures of a backlight unit in steps of an method for assembling the backlight unit according to an embodiment of the present disclosure.
Figure 12B:
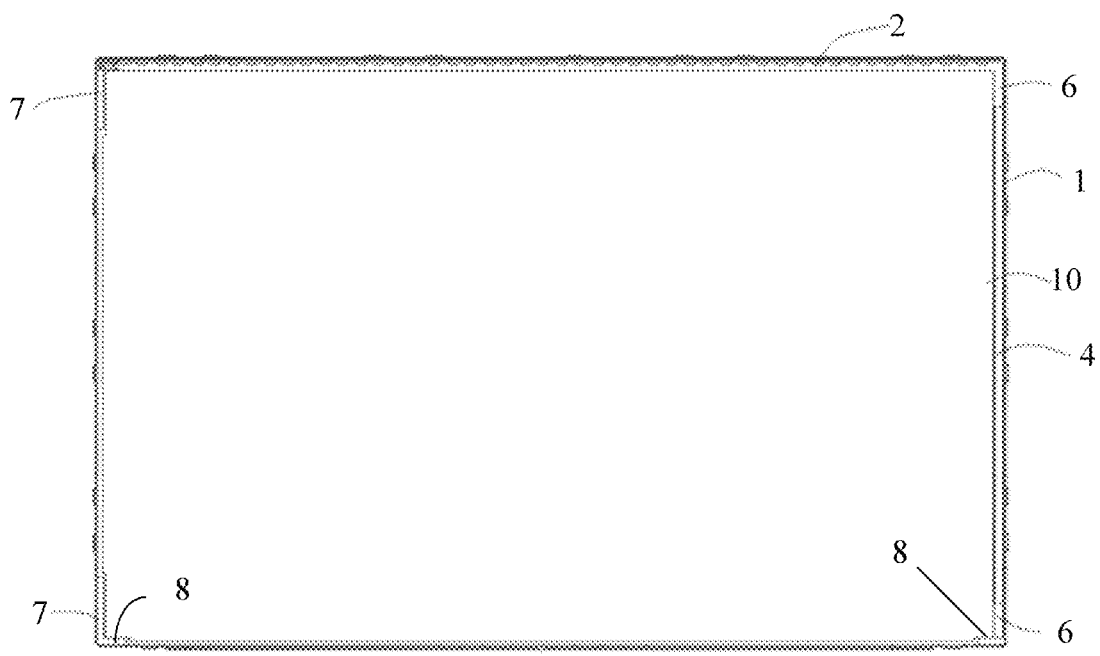

Based on the above-mentioned structure of the backlight unit, an embodiment of the present disclosure provides a method for assembling the backlight unit. Referring to FIGS. 12a to 12b, the method includes: firstly, assembling a first position limiting part 6, a second position limiting part 7 and a third position limiting part 8; specifically, assembling the position limiting parts to the corresponding side walls of the back plate 1 according to the assembling standards of the position limiting parts, and bonding the position limiting parts to the corresponding side walls through a bonding glue. The method further includes: sticking the adhesive strip 4 to the back plate 1, fixing the reflective sheet 5 to the back plate 1 by the adhesive strip 4, and fixing the lamp strip 2 to the first side wall, so that the substrate 21 is attached to the first side wall, and the light emitting surfaces of the lamp beads 22 are directed toward the inner side of the back plate 1. The method further includes: arranging the light guide plate 3, aligning the stopper 9 integrally formed with the light guide plate 3 to be flush with the substrate 21 of the lamp strip 2, aligning the light guide plate 3 to be flush with the first position limiting part 6, and then placing the light guide plate 3 downwards onto the bottom wall 11 of the back plate 1. After the light guide plate 3 is placed on the bottom wall 11 of the back plate 1, the method further includes: lightly pressing the positions of the light guide plate 3 corresponding to the second position limiting part 7 and the third position limiting part 8 so that the light guide plate 3 is assembled in place, and finally, sequentially attaching the optical films 10 to one side of the light guide plate 3 distal to the back plate 1.

By assembling the light guide plate 3 according to the method, a preset gap between the light incident surface of the light guide plate 3 and the light emitting surfaces of the lamp beads can be ensured, appropriate gaps respectively between the light guide plate 3 and the first position limiting part 6, and the second position limiting part 7 and the third position limiting part 8 can be also ensured. Meanwhile, the light guide plate 3 will not be scratched by the lamp beads and the substrate of the lamp strip 2 in the assembling method. In this way, the risk of occurring white spots in a display assembly adopting the backlight unit is reduced.

In the backlight unit provided by the present embodiment, the position limiting and fixing structure is arranged between the light guide plate and each of the lamp strip and the back plate, so that feasibility and reliability test requirements of the assembling of the backlight unit can be met both in a normal use state and a 180-degree turned over use state of the backlight unit, and meanwhile, it is ensured that the light emitting surfaces of the lamp beads and the light incident surface of the light guide plate, when the backlight unit is turned over by 180 degrees, have therebetween the set gap which can enable the light incident efficiency of light incident to the light guide plate from the lamp beads to be the highest; thereby meeting design requirements on turning the backlight unit over by 180 degrees and the display requirements on the display assembly that adopts this backlight unit, and promoting user experience.

Figure 13:
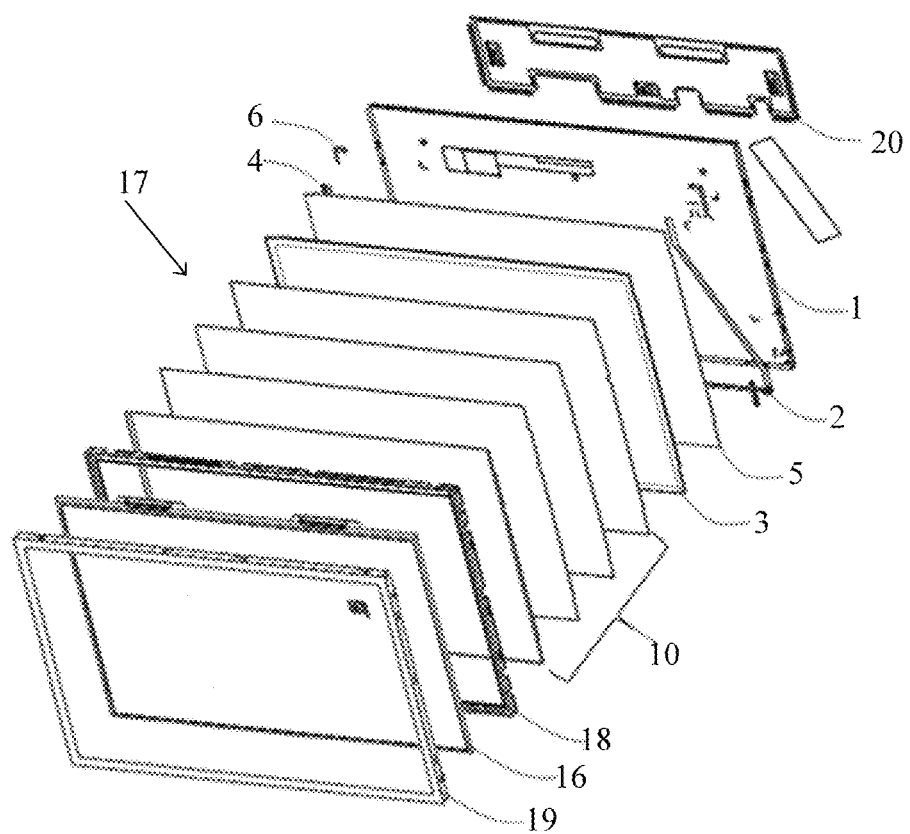
FIG. 13 is a schematic exploded view of a structure of a display assembly according to an embodiment of the present disclosure.

Referring to FIG. 13, an embodiment of the present disclosure provides a display assembly including a display panel 16, and further including the backlight unit 17 according to any one of the above-described embodiments of the present disclosure. For example, the display panel 16 is disposed on a light emitting side of the backlight unit 17.

The display panel 16 may be a liquid crystal display panel, and the backlight unit 17 may provide display backlight for the display panel 16.

Optionally, in this embodiment, the display assembly further includes a rubber frame 18 and a front frame 19, and the rubber frame 18 wraps the peripheral edges and end faces of the optical films and the light guide plate in the backlight unit 17, so as to further fix each film layer in the backlight unit 17, and prevent light leakage from an edge of the backlight unit 17. The front frame 19 wraps the peripheral edges and the end faces of the display panel 16, so that the display panel 16 is protected, meanwhile, a border of the display panel 16 may be formed to make the whole display assembly more attractive.

In addition, the display assembly may further include a circuit board arranged on the back side of the backlight unit 17 and a protective cover 20 for covering the circuit board. For example, a circuit capable of driving and controlling the display of the display panel 16 is integrated on the circuit board, and the protective cover 20 may protect the circuit board.

Through adopting the backlight unit according to any one of the above-described embodiments, it can be guaranteed that a display brightness of the display assembly provided in this embodiment will not reduce when the display assembly is turned over by 180 degrees for display, thereby promoting the display effect of this display assembly.

The display assembly provided by the present disclosure may be any product or component with a display function, such as an LCD panel, an LCD television, a display, a mobile phone, a navigator, or the like.

It will be understood that the above embodiments are merely exemplary embodiments employed to illustrate the principles of the present disclosure, and the present disclosure is not limited thereto. It will be apparent to one of ordinary skill in the art that various changes and modifications may be made without departing from the spirit and scope of the present disclosure, and such changes and modifications are to be considered to fall within the scope of the present disclosure.

What is claimed is:

1. A backlight unit, comprising:
a back plate comprising a bottom wall and a side wall around a periphery of the bottom wall;
a lamp strip comprising a substrate and lamp beads on the substrate;
a light guide plate on a side of the bottom wall provided with the side wall, the lamp strip being on a first side wall of the side wall, and light emitting surfaces of the lamp beads being opposite to a side surface of the light guide plate; and
a position limiting and fixing structure between the light guide plate and the back plate and between the light guide plate and the lamp strip, for limiting and fixing a position of the lamp strip relative to the light guide plate so that a gap between the light emitting surfaces of the lamp beads and a light incident surface of the light guide plate is kept unchanged during the backlight unit being turned over;
wherein the side wall further comprises a second side wall, a third side wall and a fourth side wall, the fourth side wall is opposite to the first side wall, and the second side wall is opposite to the third side wall; and
the position limiting and fixing structure comprises an adhesive strip, the adhesive strip is between the light guide plate and the bottom wall, and is close to the second side wall, and two sides of the adhesive strip are adhesively connected to the light guide plate and the bottom wall, respectively.

2. A display assembly, comprising a display panel and the backlight unit according to claim 1, wherein the display panel is on a light emitting side of the backlight unit.

3. The backlight unit according to claim 1, wherein an extension direction of the adhesive strip is parallel to an extension direction of the second side wall;
the adhesive strip comprises a first adhesive layer, an elastic film layer and a second adhesive layer, which are sequentially superposed together; and
the first adhesive layer is adhesively connected to the light guide plate, and the second adhesive layer is adhesively connected to the bottom wall.

4. The backlight unit according to claim 3, further comprising a reflective sheet between the bottom wall and the light guide plate; wherein
the second adhesive layer extends to a position between the reflective sheet and the bottom wall, and two sides of the second adhesive layer are adhesively connected to the reflective sheet and the bottom wall, respectively.

5. The backlight unit according to claim 4, wherein the reflective sheet and the elastic film layer have a same thickness.

6. The backlight unit according to claim 4, wherein the reflective sheet and the elastic film layer are spaced apart by a predetermined distance.

7. The backlight unit according to claim 1, wherein the position limiting and fixing structure further comprises a first position limiting part and a second position limiting part,
the first position limiting part is between the second side wall and the light guide plate, the first position limiting part is in contact with the second side wall, and is spaced apart from the light guide plate by a first distance; and
the second position limiting part is between the third side wall and the light guide plate, the second position limiting part is in contact with the third side wall, and is spaced apart from the light guide plate by a second distance.

8. The backlight unit according to claim 7, wherein the first position limiting part comprises two first sub-parts which are at a position where the second side wall is connected to the first side wall and a position where the second side wall is connected to the fourth side wall, respectively; and
the second position limiting part comprises two second sub-parts which are at a position where the third side wall is connected to the first side wall and a position where the third side wall is connected to the fourth side wall, respectively.

9. The backlight unit according to claim 7, wherein the first position limiting part comprises at least three first sub-parts which are distributed at equal intervals, and two of the first sub-parts are at a position where the second side wall is connected to the first side wall and a position where the second side wall is connected to the fourth side wall, respectively; and
the second position limiting part comprises at least three second sub-parts which are distributed at equal intervals, and two of the second sub-parts are at a position where the third side wall is connected to the first side wall and a position where the third side wall is connected to the fourth side wall, respectively.

10. The backlight unit according to claim 7, wherein the first distance is smaller than the second distance.

11. The backlight unit according to claim 7, wherein a material of the first position limiting part and a material of the second position limiting part both comprise rubber.

12. The backlight unit according to claim 2 claim 1, wherein the position limiting and fixing structure further comprises a third position limiting part between the fourth side wall and the light guide plate; and
the third position limiting part is in contact with the fourth side wall, and is in interference fit with the light guide plate.

13. The backlight unit according to claim 12, wherein the third position limiting part comprises two third sub-parts which are at a position where the fourth side wall is connected to the second side wall and a position where the fourth side wall is connected to the third side wall, respectively.

14. The backlight unit according to claim 12, wherein the third position limiting part comprises at least three third sub-parts which are distributed at equal intervals, and two of the third sub-parts are at a position where the fourth side wall is connected to the second side wall and a position where the fourth side wall is connected to the third side wall, respectively.

15. The backlight unit according to claim 12, wherein a material of the third position limiting part comprises rubber.

16. The backlight unit according to claim 1, wherein the position limiting and fixing structure further comprises a stopper which is between the light guide plate and the lamp strip, and two sides of the stopper are in contact with the light guide plate and the substrate, respectively.

17. The backlight unit according to claim 16, wherein the stopper comprises at least three sub-stoppers along an extension direction of the lamp strip, and the at least three sub-stoppers are distributed at equal intervals; and
a distance between a sub-stopper closest to the second side wall and a lamp bead adjacent to the sub-stopper closest to the second side wall is larger than a distance between a sub-stopper in a middle area of the lamp strip and a lamp bead adjacent to the sub-stopper in the middle area of the lamp strip, and is smaller than a distance between a sub-stopper closest to the third side wall and a lamp bead adjacent to the sub-stopper closest to the third side wall.

18. The backlight unit according to claim 16, wherein the stopper comprises at least three sub-stoppers along an extension direction of the lamp strip, and a distance between a sub-stopper closest to the third side wall and the third side wall is ⅓ of a length of the lamp strip.

19. The backlight unit according to claim 16, wherein the stopper and the light guide plate have a one-piece structure.

* * * * *